W. A. TACKETT.
FRAUD PREVENTING MEANS FOR COMMERCIAL PAPERS.
APPLICATION FILED MAY 18, 1918.

1,355,286.

Patented Oct. 12, 1920.

WITNESSES:

John E. Melton

INVENTOR.
William A. Tackett
BY
A. D. Jackson
ATTORNEYS.

UNITED STATES PATENT OFFICE.

WILLIAM ALBERT TACKETT, OF SHERMAN, TEXAS.

FRAUD-PREVENTING MEANS FOR COMMERCIAL PAPERS.

1,355,286.     Specification of Letters Patent.     Patented Oct. 12, 1920.

Application filed May 18, 1918. Serial No. 235,380.

*To all whom it may concern:*

Be it known that I, WILLIAM A. TACKETT, a citizen of the United States of America, residing at Sherman, in the county of Grayson and State of Texas, have invented certain new and useful Improvements in Fraud-Preventing Means for Commercial Papers, of which the following is a specification.

My invention relates to safety means for commercial papers and particularly to blank checks or drafts, and the object is to provide a simple plan of preventing fraud in business transactions by changing the figures or words to indicate something not intended in such papers as bank checks, bank drafts, bills of exchange, money orders, receipts for payments, promissory notes, and similar papers or any papers relating to business or legal transactions. Other objects and advantages will be fully explained in the description and the invention will be more particularly pointed out in the claim.

Reference is had to the accompanying drawing which forms a part of this application.

The figure of drawings is a face view of a bank check.

The usual heading is shown, including the name of the place, blank for date and number of the check, name of the bank, and the usual line including the words "Pay to," a blank for the name of payee, the words "Or bearer," and a blank for the amount of payment in figures. The form has also the usual line for the amount of payment written in words. My improvement is preferably applied to the form just under the line for the written amount of payment.

A ruled space is provided below the line for written amount of payment. This ruled space is divided horizontally into upper and lower spaces and the upper space is divided into two general divisions for dollars and cents. The upper space is the denominative division and the lower division is the digit division. The general division on the right is for cents and marked "c" and divided into "tens" space and "units" spaces. The upper general division is divided into "units," commencing to the right, "tens," "hundreds," "thousands," "tens-thousands," and as many more such divisions as may be required, and a dollar mark is placed at the left of each denominative division. The divisions are bounded by two vertical lines which extend through both the upper and the lower divisions, making the denominative divisions. In the digit divisions there are placed nine digits, the digit divisions each being divided into nine equal spaces by vertical lines. For illustration, a check is drawn for $7060.05, the invention can be best explained by explaining with this amount. A cross-mark is punched under the digit 7 and a cross-mark is punched to the right of the word "thousand." These two marks or punches mean that there are no amounts higher than 7000 and a person could not collect anything higher than 7000. A blank space is provided at the right side of each denominative term for a punch mark which is to serve as a guard check on the amount to be paid. A punch mark to the left of the 7-punch would indicate that the check had been tampered with and the check would not be cashed. Another digit in the thousandth division punched would show that something was wrong because there could be only one digit in the thousandth place. A cross mark is punched in the space for hundreds on the right side of the hundreds division, but no digit is punched. If a person were to punch one of the digits in the hundreds division, this would show that the check had been tampered with because a punch under a digit and a punch to the right of the name of the denominative division is given the meaning that everything higher or to the left of these two punches is canceled and no amount higher can be collected on the draft or check. In the "tens" denominative division, a cross is punched under the digit 6. There could be no other tens digit. No mark is punched to the right of the word "tens" because this would mean that hundreds and thousands were all canceled and nothing higher than tens could be collected on the draft or check. In the units division of the dollar division, a mark is punched to the right of the word "units," but no digit is punched. If a digit was punched, this would mean that nothing higher than units could be collected on the check or draft. The cents division is treated in the same manner.

Any suitable punch for making any suitable cut may be used and in practice it will be preferable to punch the digits out which are to name the amount. The papers may contain the usual entries to indicate the amount in addition to the improvement herein set forth.

What I claim is,—

In a commercial paper, a ruled form in said paper comprising a rectangular space bounded by lines and said space divided into two parts generally to form denomination and digit divisions forming a single line for denominative terms and a single line for digits, both divisions divided vertically or transversely to form spaces for words and symbols in said denominative division, words and symbols entered therein to indicate denominations, each denominative division having a blank space on one side of the term therein for a punch mark to indicate that no greater amount than the denominative term in the division with the punch mark should be paid, and to form spaces for digits in said digit division and each space being divided for individual digits, and digits entered therein to be selectively punched out to indicate sums of money in coöperation with said symbols and words, and having a signature receiving space below said divided spaces and a line indicating the signature space.

In testimony whereof I set my hand, this sixth day of May, 1918.

WILLIAM ALBERT TACKETT.